United States Patent
Henkes

[11] Patent Number: 4,735,495
[45] Date of Patent: Apr. 5, 1988

[54] LIGHT SOURCE FOR LIQUID CRYSTAL DISPLAY PANELS UTILIZING INTERNALLY REFLECTING LIGHT PIPES AND INTEGRATING SPHERE

[75] Inventor: John L. Henkes, Latham, N.Y.
[73] Assignee: General Electric Co., Schenectady, N.Y.
[21] Appl. No.: 941,002
[22] Filed: Dec. 12, 1986
[51] Int. Cl.$^4$ .............................................. G02F 1/13
[52] U.S. Cl. .................................... 350/345; 362/310; 362/347; 362/355
[58] Field of Search ................. 350/345; 362/32, 296, 362/310, 343, 347, 355

[56] References Cited
U.S. PATENT DOCUMENTS

| | | | |
|---|---|---|---|
| 3,676,667 | 7/1972 | Malifaud | 362/347 X |
| 4,613,207 | 9/1986 | Fergason | 350/339 F X |

Primary Examiner—Stanley D. Miller
Assistant Examiner—Richard F. Gallivan
Attorney, Agent, or Firm—I. D. Blumenfeld

[57] ABSTRACT

This invention relates to a collimated light source for a flat panel liquid crystal display which uses a high intensity light source positioned in an integrating sphere. One or more tapered light pipes have their narrow end(s) positioned in an opening in the integrating sphere. Light from the integrating sphere is internally reflected in the light pipes(s) to produce a relatively collimated output beam which is projected onto one surface of the liquid crystal panel display.

This invention relates to a light source for a liquid crystal panel display and, more particularly, to a collimated light source utilizing light pipes and an integrating light sphere.

10 Claims, 2 Drawing Sheets

LIGHT SOURCE FOR LIQUID CRYSTAL DISPLAY PANELS UTILIZING INTERNALLY REFLECTING LIGHT PIPES AND INTEGRATING SPHERE

BACKGROUND OF THE INVENTION

Flat panel liquid crystal displays, particularly of the type having individual liquid crystal elements or pixels arranged in an orthogonal row and column arrangement are well known and useful in a variety of applications. In transmissive displays using twisted nematic liquid crystals, polarizers are located on each side of the panel and a light source is positioned behind the panel. Due to the nature of the arrangement of molecules in nematic liquid crystals, light from a particular off-axis direction is not equally affected as light from other off-axis directions. If a display is in a mode to block light from being transmitted through it, the result, because of this effect is to not equally block the light from all axial directions.

It would, obviously, be useful to illuminate the flat panel displays with light normal to the cell and collimated, thereby avoiding the loss of contrast (lack of blocking) in viewing the cell from a particular direction.

It is therefore a principal objective of the invention to provide a collimated light source for all axes or particular axes off the normal for a flat panel liquid crystal display.

Yet another objective of the invention is to provide a collimated light source for liquid crystal displays utilizing tapered light pipes.

Still another objective of the invention is to provide a collimated light source for flat panel liquid display which utilizes a combination of light pipes and an integrating light sphere.

Other objectives and advantages of the invention will become apparent as the description thereof proceeds.

BRIEF SUMMARY OF THE INVENTION

The advantages of the invention are realized in an arrangement in which a high intensity light source is positioned in a light integrating sphere. Light from this source is uniformly distributed over the interior surface. An exit opening in the sphere acts as the entrance pupil for a tapered light pipe or an array of tapered light pipes with the small end of the tapered pipe(s) being positioned in the opening. Light existing from the sphere is nternally reflected in the pipe(s) so that collimated light is emitted at the other end to illuminate the display.

The novel features which are characteristic of this invention are set forth with particularly in the appended claims. The invention itself, however, together with further objectives and advantages thereof, may best be understood by reference the following description taken in connection with the accompanying drawings in which:

DETAILED DESCRIPTION OF THE INVENTION

Figure 1:
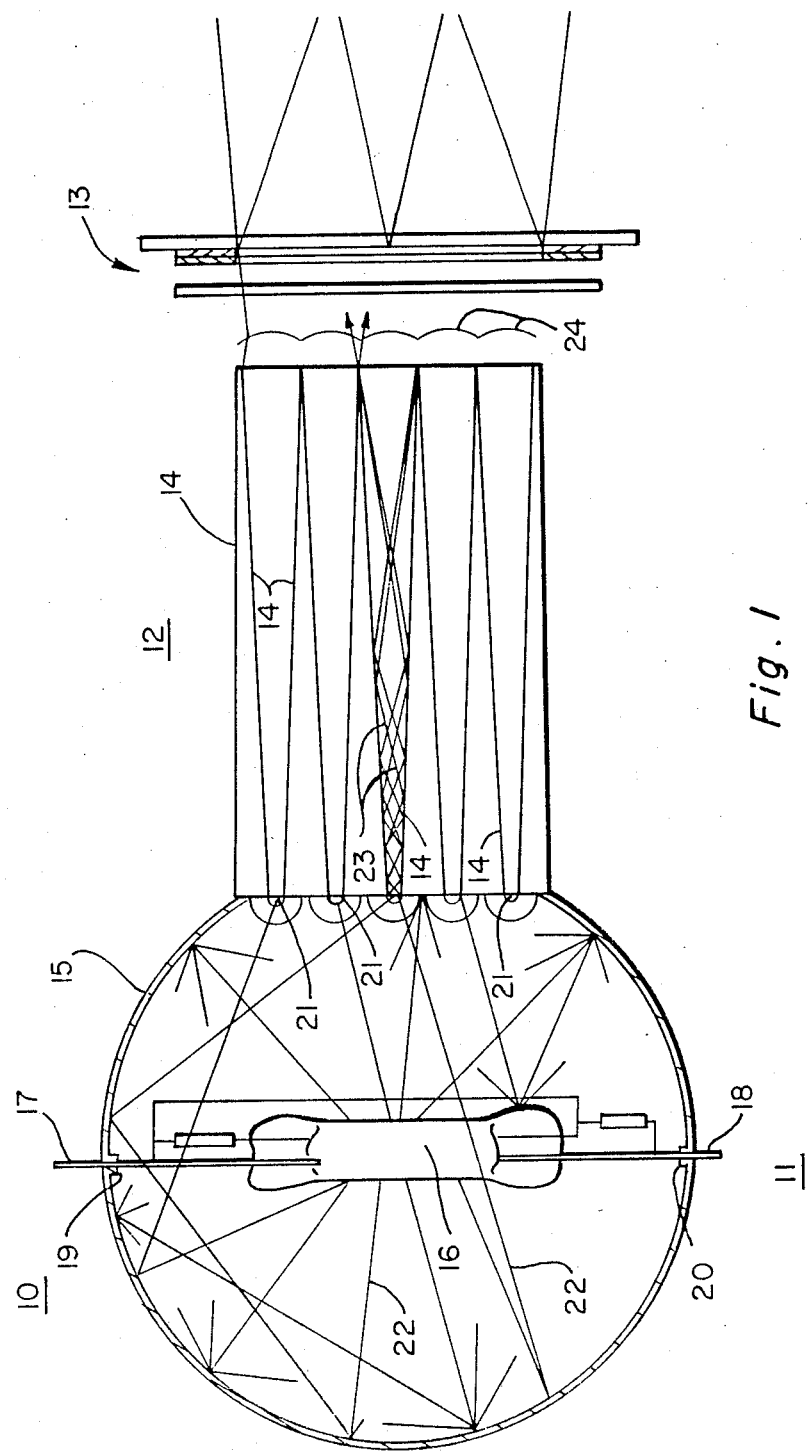
FIG. 1 is a sectional schematic view of a collimated light source incorporating a light integrating sphere, light pipes and a liquid crystal display panel.

FIG. 1 schematically illustrates the collimated light source for a liquid crystal display panel and particularly illustrates how the tapered light pipes and the light integrating sphere cooperate to produce full internal reflection of the light rays to produce a collimated output for illuminating the liquid crystal display. It should be pointed out at this time that providing a collimated light source to illuminate the flat panel display achieves the dual objective of increasing the useful light illuminating the display as well as enhancing the contrast ratio of the display. That is, in order to enhance contrast ratio of the display in the unactivated state (an important visual parameter of any liquid crystal display) collimated light for illuminating the display is desired, with the designer of liquid crystal display specifying the degree of collimation; i.e. the maximum deviation from absolutely collimated light that may be tolerated. Thus, in a typical liquid crystal flat panel display, the designer of the flat panel may, for example, specify that the collimation deviation may not exceed ±10 degrees, thus providing a total deviation of 20 degrees. Knowing the maximum permissible deviation of the collimated light, the length and taper of the light pipes necessary to produce total internal internal reflection and collimation of the light may then be readily calculated.

The collimated illuminating system for a liquid crystal display includes the light source 10 which includes a light integrating sphere 11 and a light pipe means 12, one end of which receives light from the sphere. The other end of the light pipe means is positioned adjacent to a liquid crystal flat panel display 13, one side of which is illuminated by the collimated light exiting from the light pipe means. The length and taper of the light pipe means is selected to provide total internal reflection of light, each reflection reducing the angle made with light pipe axis, thereby resulting in a collimated light output exiting and illuminating the flat panel display. The relative widths of the input and output ends of the light pipes, and hence, their ratio is a function of the maximum permitted deviation from the absolute collimation. The manner in which in width of the narrow end is determined will be discussed in detail later.

Integrating sphere 11 consists of a metallic sphereical member 15 lined with a light-reflecting layer 16 which may for example be a layer of barium sulfate with a reflectivity of 99.8 percent which may be obtained from the Eastman Kodak Company of Rochester, NY under its trade designation Kodak 6030. Positioned in the integrating sphere is a high intensity discharge lamp 16. Lamp outlet leads 17 and 18 are brought out of the sphere through glass stand-off insulators 19 and 20. The light integrating sphere has a light outlet opening 20 to which the light pipes 14 are secured. Opening 20, as shown in FIG. 1, consist of a plurality of openings 21 in which the narrow ends of the tapered light pipes are located.

Each of the openings 21 is the entrance pupil of its associated light pipe 13. Thus the narrow end of the light pipe is closest to the light source with the wider end of the light pipe positioned adjacent to the display. Light rays 22 from the high intensity discharge lamp are multiply reflected from interior reflecting layer 16. Direct or reflected light rays 22 which impinge on the openings are internally reflected within the light pipes, as shown at 23, and are emitted from the wide end of the light pipe to illuminate the liquid crystal cell. As may be seen in FIG. 1, the wide ends of the individual light pipes are in contact so that light emitted from the pipes overlaps to provide complete illumination of the active area of the flat panel display. That is, the light distribution across each pipe is somewhat Gaussian so that the array of light pipes shown in FIG. 1 will uniformly illuminate a large display area because the light from adjacent pipes overlap slightly, as shown at 24.

The total width of the wide ends of the individual light pipes equals the width of the active area of the display whereas the length of the light pipes (more clearly shown in FIG. 2) equals the height of the liquid crystal flat panel display.

As pointed out above, the width of each light pipe adjacent to the display is determined by the width of the display and the number of light pipes to be utilized. Thus, for example, is a 4×4 inch flat panel display is to be utilized and 8 individual light pipes are to be utilized, the width of each the light pipes adjacent to the display must be 0.5 inches while the height of each light pipe must equal 4 inches, the height of the display. Dimension of the narrow end of each light pipe (once the width of the wide end is known and the taper is known) is determined by the maximum permitted deviation.

Thus, if the display designer limits the deviation to ±11.5 degrees (23 degrees total), the width of the narrow end, and hence the ratio light pipe exit and entrance widths is determined in the following manner. The critical light ray, i.e. one deviating by 11.5 degrees, from a line orthogonal to one edge of the wide end is drawn through that edge and through the tapered light pipe. The point which is the point of convergence of the sides of the tapering light pipe, is the center of a circle which is tangent to the critical light ray. The point at which that circle crosses the tapered edges of the light pipe is the point at which the light pipe is cut off to form the narrow end of the light pipe. This then determines the ratio of the wide and narrow ends of the light pipe and hence (depending on the width and the angle of taper) the length of the light pipe from its narrow to its wide end.

Figure 2:
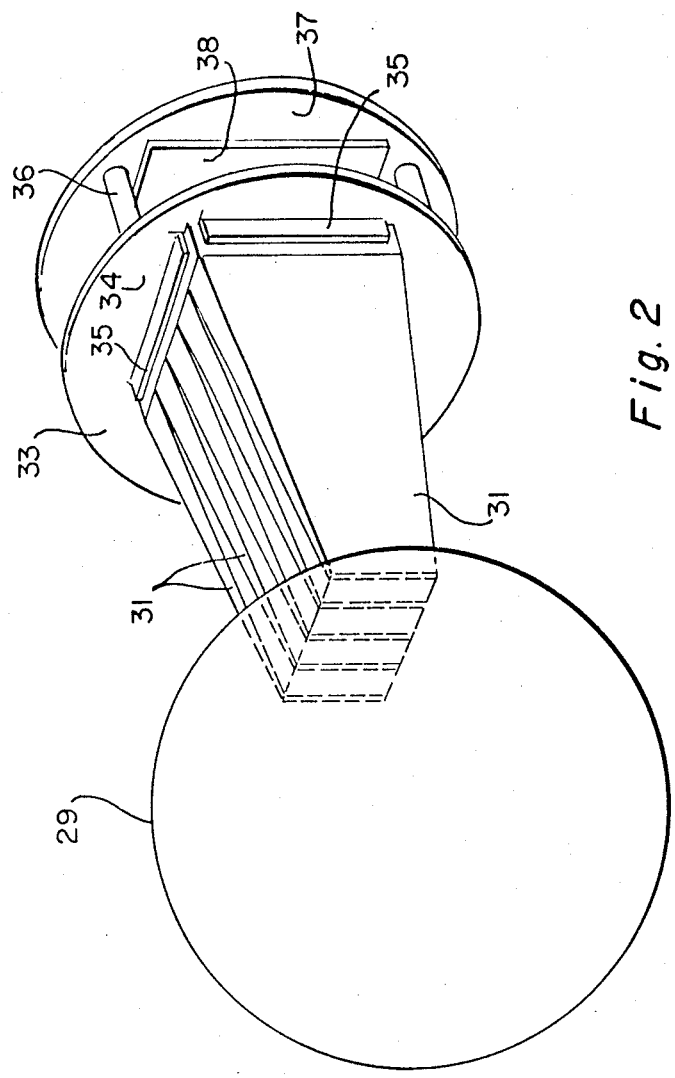
FIG. 2 is a perspective view of the collimated light source of invention showing a plurality of light pipes associated with an integrating light sphere.

FIG. 2 illustrates, in partial perspective, a collimated light source consisting of a spherical light integrator, a plurality of tapered light pipes with the ends from which collimated light exits positioned adjacent to a display. Thus, an integrating sphere is shown having leads from a high intensity discharge lamp (not shown) extending this sphere through the glass stand-off insulators shown at 30. The narrow ends of a plurality of tapered rectangular light pipes 31 art positioned adjacent to openings in the light integrating sphere 29. The light pipes are supported at their wide ends by a mounting bracket 33 consisting of four rail members 34, each of which has a right angle flange 35. The four rails are mounted in a rectangular configuration and in conjunction with the flanges provide a rectangular opening in which the tapered rectangular right pipes are secured.

Thus, the tapered ends of the light pipes are supported between the two horizontal rails and touch each other at their edges to provide a continuous surface through which the light exits. Attached to the mounting bracket 31 by means of posts 36 is a housing 37 which supports the flat panel liquid crystal display 38. The arry of light pipes thus illuminate one surface of the liquid crystal panel with collimated light.

The flat panel display, as is well known, typically will consists of two transparent glass plates separated by sealant round its edges to define a cavity in which a twisted nematic liquid crystal is retained. The interior surfaces of the transparent plates have the pixel elements deposit thereon in the form of rows or columns to provide a matrix liquid crystal display which may be selectively actuated to display a variety of signs, symbols or dipictions.

The liquid crystal flat panel elements will also include diffusers as well as polarizers which are maintained at determined angles to each other so that the liquid crystal is light transmitting in one state and light blocking in another state, depending on the energization of the individual pixels. The flat panel display matrix has transparent conductive and metallic back plane on the interior surface of one of the substrates and individual transparent, conductive electrodes arranged in rows and columns in the interior surface of the other substrate to form the pixel matrix. The transparent electrodes may be fabricated of a transparent metal such as indium tin oxide (ITO) or other similar metals.

The invention as shown in FIGS. 1 and 2 has been described and illustrated as comprising an integrating light sphere which includes an exit pupil leading to an array of tapered light pipes providing uniform collimated illumination for backlighting of an LCD display. The invention, however, is not limited to an array of individual tapered light pipes.

An array of individual light pipes may readily be replaced by a single tapered light pipe having dimensions related to those of the LCD display. Utilizing the example previously referred to for a 4×4 flat panel display. The width of the single light pipe at its wide end would be four inches and its length would also be four inches, thus replacing the individual light pipes, the aggregate widths of which equal the width of the display.

While the instant invention has been described in connection with preferred embodiments thereof, invention is by no means limited thereto since other modification of the instrumentation employed may be made and still fall into the scope of the invention and it is the intention of the appended claims to corner all such modifications that fall within the true spirit and scope of the invention.

What is claimed as new and desired to be secured by Letters Patent is:

1. A high contrast ratio liquid crystal display including:
   (a) a liquid crystal display;
   (b) a collimated light source positioned to illuminate one side of said display comprising;
     (1) a light integrating sphere having an interior reflecting surface for a source of uncollimated light, said integrating sphere uniformly distributing the uncollimated light, and having an opening to permit a portion of the uncollimated light reflected from the interior surface to exit from the sphere;
     (2) tapered elongated light pipe means, one end of said light pipe positioned adjacent to said opening to intercept light emitted from said sphere and the other end of said light pipe means being positioned adjacent to said display whereby light from said sphere is internally reflected in said light pipe means and exits from said other end as a collimated light beam.

2. The liquid crystal display according to claim 1 wherein said light pipe means is tapered to facilitate collimation through internal reflections of light entering said one end.

3. The liquid crystal display according to claim 2 wherein the narrow end of said tapered light pipe means is positioned adjacent to the opening in said sphere.

4. The liquid crystal display according to claim 1 wherein the light pipe means comprises a plurality of light pipes.

5. The liquid crystal display according to claim 4 wherein the wide ends of the tapered light pipes contact each other to form a continuous light emitting surface.

6. A high contrast ration liquid crystal display including:
   (a) a liquid crystal display;
   (b) a collimated light source positioned to illuminate one side of said display comprising;
      (1) a light integrating sphere containing a source of uncollimated light having a plurality of openings to permit a portion of the uncollimated light to exit from said sphere;
      (2) elongated light pipe means, comprising a plurality of light pipes, one end of said plurality of light pipes positioned adjacent to one of said plurality of openings.

7. A collimated light source comprising:
   (a) a light integrating sphere, said sphere having an internal layer for uniformly distributing and reflecting uncollimated light;
   (b) a source of uncollimated light positioned in said sphere;
   (c) said sphere having an opening over a portion of its surface to permit a - - portion of the uniformly distributed light from the source to exit from the sphere;
   (d) elongated light pipe means having one end positioned adjacent the said opening to intercept light emitted from said sphere;
   (e) said light pipe means being tapered for substantially totally internally reflecting light introduced at said one end whereby light emitted at the other end of said light pipe means is substantially collimated.

8. The collimated light souce according to claim 7 wherein said light pipe means is tapered to facilitate collimation through internal reflection of light intercepted at said one end of said light pipe means.

9. The collimated light souce according to claim 7 wherein said light pipe means comprises a plurality of light pipes.

10. The collimated light source according to claim 9 wherein the wide ends of said tapered light pipes contact each other to form a continuous light emitting surface.

* * * * *